2 Sheets—Sheet 2.
H. PACKER.
Corn-Sheller.
No. 206,258. Patented July 23, 1878.
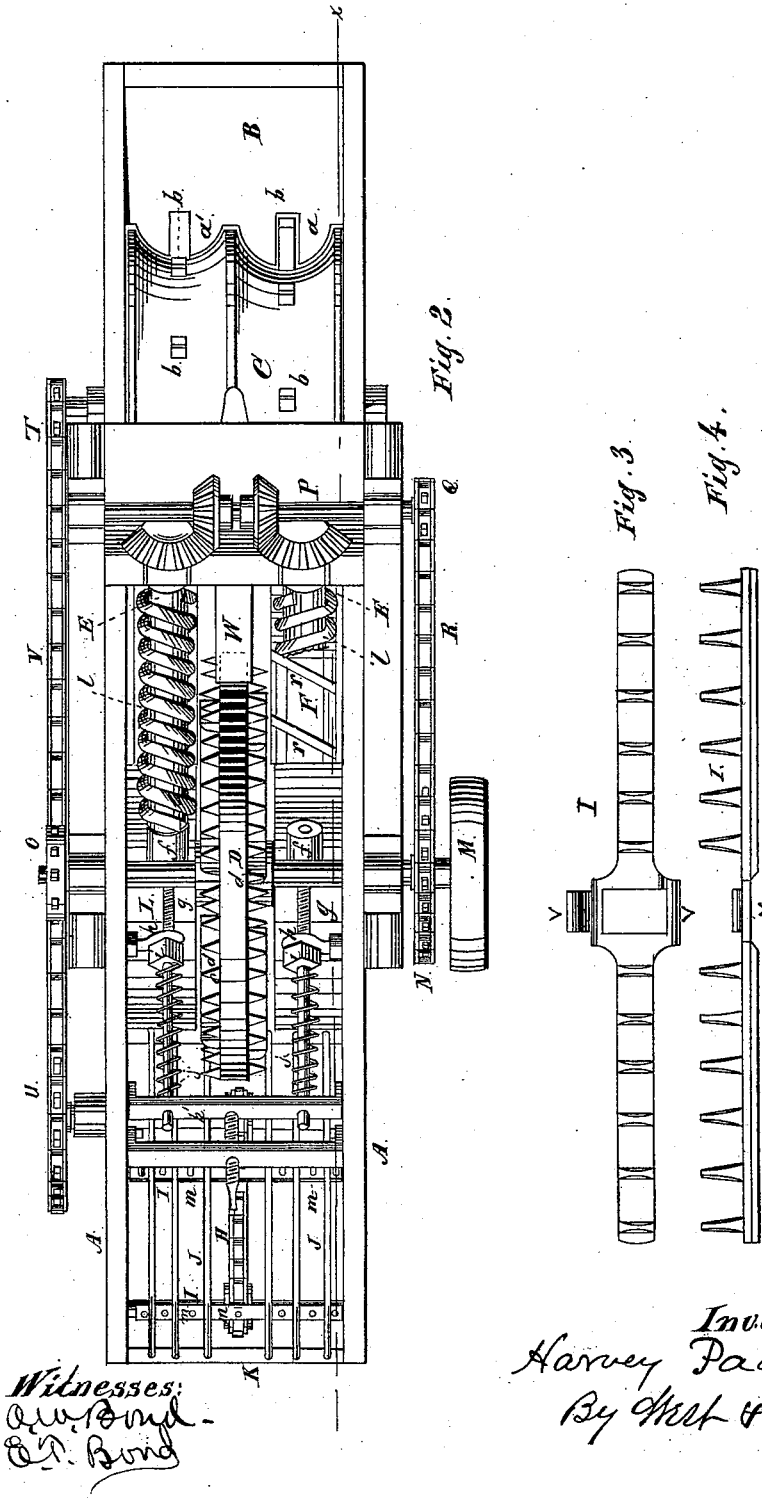
Witnesses:
O. W. Bond
E. P. Bond
Inventor:
Harvey Packer
By West & Bond
Attys

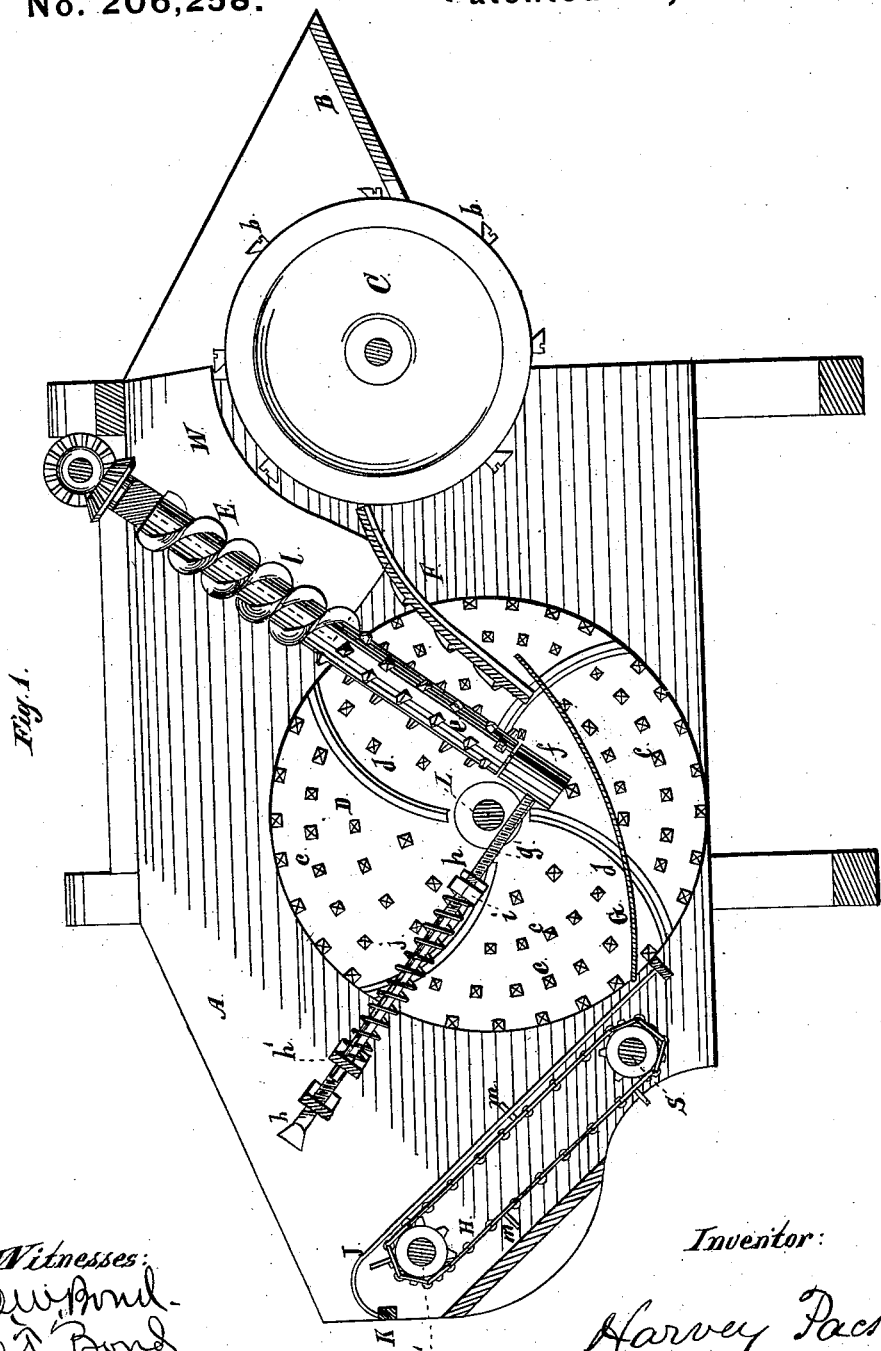

UNITED STATES PATENT OFFICE.

HARVEY PACKER, OF SANDWICH, ILLINOIS.

IMPROVEMENT IN CORN-SHELLERS.

Specification forming part of Letters Patent No. 206,258, dated July 23, 1878; application filed August 16, 1877.

*To all whom it may concern:*

Be it known that I, HARVEY PACKER, of Sandwich, De Kalb county, State of Illinois, have invented new and useful Improvements in Corn-Shellers, of which the following is a full description, reference being had to the accompanying drawings, consisting of two sheets, in which—

Figure 1 is a vertical section at *x* of Fig. 2; Fig. 2, a plan view; Figs. 3 and 4, enlarged details of the cob-rake.

This invention consists in a rotating feed-wheel provided with cups or brackets, to feed the corn to the shelling devices; in a picker-wheel provided both with teeth and with ribs, as hereinafter described; in one or more shafts, each provided with a worm, to facilitate the feeding and shelling, said shafts being automatically adjustable at one end, to adapt themselves to ears of different sizes, as hereinafter specified; in a plate or shoe located upon the side, at one side of the picker-wheel, and provided with transverse ribs, as hereinafter described; and in a cob-rake of peculiar construction.

In the drawings, A represents the case, within which the operating parts are located. B is a hopper. C is a feed-wheel. The machine represented is adapted to receive and shell two ears at the same time, one upon each side, and this wheel C, as shown, has two grooves in its periphery, one for each passage. *b* are brackets or projections upon the periphery of the feed-wheel C, located at such distance apart that the longest ear can lie lengthwise between two of them. Cups might be used instead of the brackets for the purpose of feeding. D is the picker-wheel. It is provided with a series of teeth, *c*, upon each side, and with a series of continuous flanges, *d*, which project from the face of the wheel the same distance as do the teeth *c*.

E are two shafts, upon each of which is a worm, *l*. These worms or spirals *l* extend around their shafts in opposite directions, and these shafts E rotate in opposite directions. The lower ends of these shafts E are supported in bearings *f*, which bearings are movable. As represented, these bearings *f* are secured to rods *g*, which rods can move in guides *h h'*. The guide *h* may be secured upon the inside of the case, and the guide *h'* may be a bar extending nearly across from side to side, within the case, but not secured thereto, so that the position of this bar *h'* can be adjusted, which may be done by means of a screw, *k*, passing through a bar secured upon the inside of the frame. *i* is a nut located upon the rod *g*, between which nut and the bar *h'* is located a coil-spring, *j*, which encircles the rod *g*. The nut *i* can be adjusted upon the rod, and limits its upward movement by coming in contact with the guide *h;* and the bearing *f* is held down to its place by means of the spring *j*, except when elevated by the pressure of a large ear.

F is a curved plate or shoe secured to the inside of the case. For a little distance from its lower end it is nearly parallel with the shaft E, and then curves back, so as to form a large throat for the entrance of the ear. G is a plate, along which the cobs pass after the corn has been shelled therefrom. H is an endless chain, to which are secured a number of rake-heads, I, provided with teeth *m*. This chain passes over two small sprocket-wheels, one located at or near the center of the shafts *s s'*, which shafts are supported in suitable bearings in the sides of the frame.

J are metal rods, the upper ends of which are curved over and carried a little distance from the rake-teeth, and supported in a cross-bar, K, and their lower ends are supported in another cross-bar. The rake-teeth *m* are so arranged as to pass between and project above the rods J.

The picker-wheel D is located upon a shaft, L, supported in suitable bearings. Each end of this shaft projects beyond the case. M is a driving-pulley on the shaft L. N is a sprocket-wheel on the shaft L. O is a small sprocket-wheel on the opposite end of the shaft L. P is another shaft, having upon it two bevel-wheels, which engage with bevel-wheels upon the upper ends of the worm-shafts E. Q is a small sprocket-wheel upon one end of the shaft P. R is a chain, which runs over the sprocket-wheels N Q.

The feed-wheel C is located upon a shaft, upon one end of which is a small sprocket-wheel, T. Upon the end of the shaft S is a sprocket-wheel, U.

V is a chain, which runs over the sprocket-wheels T and U, which chain is driven by the sprocket-wheel O, the chain passing under the wheel.

All of the parts of the machine are driven from the pulley M, L being the main driving-shaft, motion being given to the picker-wheel by the rotation of the shaft L, and to the worm-shafts E through the chain R, sprocket-wheel Q, shaft P, and bevel-wheels, while the feed-wheel and the rake are driven by means of the sprocket-wheel O, which drives the chain V, which passes over the sprocket-wheels T and U.

The shoe or plate F is provided with transverse ribs $r$, which aid in removing the corn. As the ear has a rotary movement, it comes in contact with such ribs.

W is a partition, forming, with the sides of the case, two passages, through which the ear passes to the shelling devices.

The operation of the machine is as follows: The same being in motion, corn is to be fed into the hopper B, the ears one after another falling into the spaces between the brackets $b$, or into cups upon the periphery of the wheel C, and are carried into the passages beneath the worm-shafts E. The ears are fed by a force feed, and are carried down, one upon each side of the picker-wheel D, and between the worm-shafts E and shoe or plate F, and by the action of the teeth $c$ upon D, and the worms $l$ upon the shafts E, the ear will be rotated and the corn shelled therefrom, which operation will be aided by the ribs upon the outer surface of the shoe or plate F. If the corn be damp, the flanges $d$ upon the sides of the picker-wheel will assist in removing any kernels which might otherwise be left. The lower ends of the worm-shafts E can rise and fall sufficient to adapt themselves to ears of different sizes, as before described.

After the corn has been shelled from the ear, the cob is forced along the plate G to the cob-rake, and the cobs will be carried up along the rods J by the teeth $m$, and will be delivered over the upper ends of the rods.

Any loose stuff of a small size will rattle down between the rods J, and fall upon a separator; and as the teeth of the rake pass away from the upper end of the rods, any silk or husks which might otherwise be entangled therein will be drawn off from the teeth, and the teeth will always be kept clear.

I am aware that a belt or continuous apron has been used for the purpose of carrying away the cobs; but my device for this purpose I find to be far better.

It will be perceived that the shelling is performed upon three sides of the ear, which has a constant rotary movement, produced by the action of the worms and picker, the direction of the rotation of the worms being such that the ears cannot become clogged between the worms and picker.

I have shown a single picker-wheel and two worm-shafts. A series of such wheels and shafts might be used in a large machine, suitable passages being provided for the ears, which are fed to each worm-shaft. The picker does not feed the ear, but revolves it, and helps to shell the corn therefrom.

In a machine constructed as described, the shelling of the corn is performed very near to the center of the picker-wheel, which is located upon the main driving-shaft, requiring less power than where the shelling is performed near the periphery of the wheel.

The feed-wheel may be about thirty inches in diameter, and the worm-shafts about two and one-half inches in diameter, and the other parts in proportion.

The worms on the worm-shafts may be continuous, as shown upon one worm in the drawings; or the worm may be partly cut away, so as to present teeth, as shown at $e$, upon the lower end of one of the shafts E, instead of a continuous worm.

It has been customary to provide corn-shellers with picker-wheels for the purpose of feeding ears to the shelling devices. My feed-wheel C dispenses with such picker-wheels, substituting a positive forced feed therefor.

The shoe or plate F might be made automatically adjustable, and the lower ends of the shafts E might be fixed; but this construction is not as desirable as the other.

The rake-head is provided with a link, $v$, which is cast with the head. This link is like one of the links of the endless chain, and forms one of the links of such chain.

By making the periphery of the feed-wheel concave, such ears as lie across it will not be taken up, as the projections $b$ will pass under the ears there; and when one end only lies upon the outer rim or edge, the projection first striking it will straighten the ear for the next one to take it up. In shelling corn it is important that the outer coating or enamel of the grain should not be scratched, as such scratching promotes decay and injures the market value. It is therefore important that the grains should pass out of the machine as soon as possible after being detached from the cob. For this purpose the plate F and shaft E are placed away from the vertical line, and inclined so that the grains will pass out between the plate F and the picker-wheel without traversing the length of the shelling parts, and also to get the shelled grains out of the way, so as not to clog or impede the free action of the sheller.

What I claim as new, and desire to secure by Letters Patent, is as follows:

1. In a corn-sheller, the concave feed-wheel C, provided with brackets $b$ or cups, for the purpose of feeding the ears to the shelling devices, substantially as specified.

2. In a corn-sheller, one or more shafts, E, each provided with a worm, $l$, or teeth $e$, and projecting beyond the picker-wheel into the hopper, for the purpose of facilitating the feeding of the ears, and also to aid in shelling, substantially as specified.

3. In a corn-sheller, one or more shafts, E, each provided with a worm or teeth, the lower end of each shaft being located in an automatically-adjustable bearing, for the purpose of adjusting the position of the shafts without changing the space between the shaft and the picker-wheel, as may be required in shelling ears of different sizes, substantially as specified.

4. In a corn-sheller, the shoe or plate F, in combination with the wheel D and shaft E, arranged in an inclined position, and with a space between the plate and picker-wheel, so that the grains will pass out without traversing the length of the shelling-space, substantially as and for the purpose set forth.

5. The combination of the feed-wheel C, picker-wheel D, shafts E, provided with a worm or teeth, and shoe F, substantially as and for the purposes specified.

6. The shaft E, provided with a worm or teeth, adjustable bearing $f$, rod $g$, and spring $j$, so that the shaft will move in line with the face of the picker-wheel, combined substantially as and for the purposes specified.

7. The concave feed-wheel C, having the projections $b$, in combination with the hopper B, substantially as specified.

8. The combination of the feed-wheel C, feeding endwise, and plates F G, with the picker-wheel D and shafts E, substantially as described.

9. The combination of the bearings $h\ h'$, rods $g$, springs $j$, and the set-screw $k$, for adjusting the downward pressure of the shafts E, substantially as described.

HARVEY PACKER.

Witnesses:
E. A. WEST,
O. W. BOND.